May 8, 1928. 1,669,072
G. H. VINETTE
VEHICLE BRAKE
Filed July 3, 1926

INVENTOR.
G. H. Vinette
By Edward N. Pagelsen,
ATTORNEY.

Patented May 8, 1928.

1,669,072

UNITED STATES PATENT OFFICE.

GEORGE H. VINETTE, OF DETROIT, MICHIGAN.

VEHICLE BRAKE.

Application filed July 3, 1926. Serial No. 120,394.

The present invention relates to fluid pressure brakes and means for operating them.

Among the objects of the invention is to simplify and reduce the cost of the construction of such brakes and at the same time render them more efficient.

Another object of the invention is a simple, compact and efficient operating mechanism for fluid pressure brakes adapted to give a smooth powerful application when needed in emergencies or a light braking when in ordinary use.

Other objects will readily appear to those skilled in the art upon reference to the following description and drawings, in which :—

Figure 1:
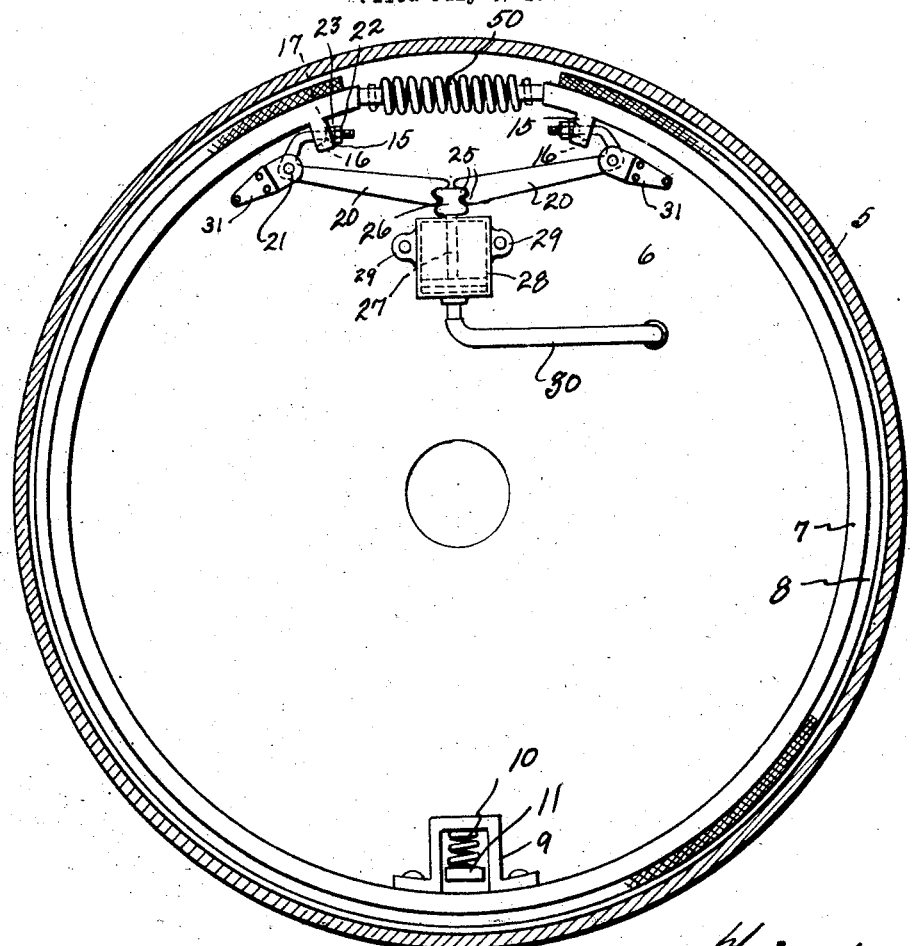
Fig. 1 is an elevation of the brake operating means.

In the drawings, a brake drum 5 is shown in section and this will be attached in the usual manner to a wheel (not shown). At 6 is indicated a brake supporting and anchor plate mounted on the end of an axle (also not shown).

Carried by plate 6 in position to be expanded into contact with drum 5 is a flexible brake band 7 provided with a suitable friction surface material 8. The band will be supported, at the side opposite the operating mechanism, by a conventional stirrup 9 co-acting with spring 10 and the stud 11, the latter being carried by plate 6.

The band 7 formed into a ring is adapted to have its free ends pressed apart to thereby increase its diameter and cause contact with the drum 5. This expanding action as well as the supporting and anchoring of the free ends of the band is accomplished in the present invention by fixing the lugs 15 to the free ends of the band, these lugs being provided with openings 16 which taper toward each other and are generally parallel to the adjacent portions of the band and have semi-cylindrical or semi-spherical seats 17 at the smaller ends of the openings which seats are in the surfaces of the lugs opposed to each other as indicated. Extending through openings 16 are the short ends of levers 20 which are pivoted as at 21 to plate 6 at a point back of the band as indicated and whose long ends extend toward each other as shown. In Fig. 1 the levers 20 are shown as bent in the form of a hook with the pivot point at the bend. The extreme portion of the short end of lever 20 will be threaded and provided with a nut 22 and rounded washer 23 adapted to fit the seat 17. By this means proper adjustment may be provided.

The operation of the brakes will be accomplished by moving outwardly the long ends of the levers 20 and this is best accomplished by forming on these ends gear teeth 25 adapted to coact with a double rack 26 carried by the piston rod 27 of a fluid pressure actuating cylinder 28 anchored as by lugs 29 to plate 6 and supplied from a suitable source of pressure fluid through conduit 30.

Figure 2:
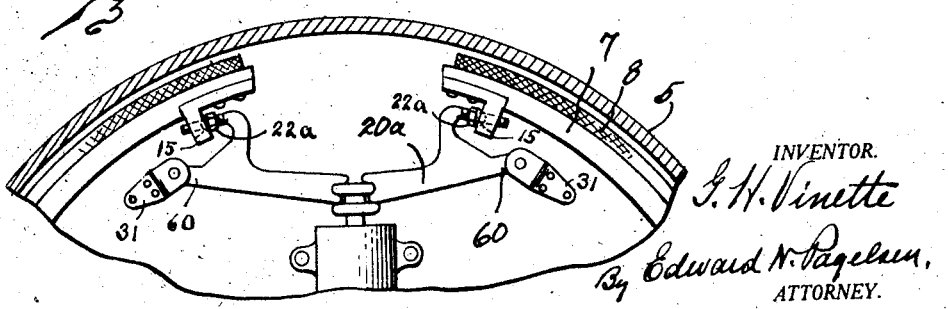
Fig. 2 is a view of a modified form thereof.

The form of device shown in Fig. 2 is the same as that of Fig. 1 except that the levers 20ª instead of being bent as in Fig. 1 are branched and pivoted at the end of one of the branches 60 while the other branch extends through lug 15. On account of the form of this lever the adjusting nut 22ª will be at the hilt of the branch and not at its tip.

The operation of the two forms is identical except that in one form a pull and in the other a push is exerted on the end of the band to expand the same and move the end outwardly against the drum.

The braking reaction is taken on stud 11 and one of the levers 20 or 20ª.

The return of the brake is accomplished by means of a tension spring 50 connecting the ends of the band 7.

Having now described the invention and the preferred form of embodiment thereof, it is to be understood that the said invention is not to be limited to the specific details herein set forth but only by the scope of the claims which follow:

I claim:—

1. An internal expanding brake having operating means consisting of a pair of levers pivoted back of and below the ends of the brake band and extending toward each other, lugs on said bands between the band ends and said pivots, arms on said levers connected to said lugs, gear teeth on the free ends of said levers, a double rack meshing therewith, and fluid pressure means adapted to force said rack radially outward.

2. A brake mechanism comprising a drum and a plate at one end thereof, a flexible internal brake band adapted to be expanded against said drum, a pair of levers pivoted intermediate their ends on said plate and each having an arm connected to and supporting a free end of said band, the pivots of said levers being separated a greater distance than the points of connection of their arms to said band, the other arms of said levers extending toward each other, said levers being so arranged as to cause the band to expand when said other arms are moved outwardly, and means to move said last mentioned lever arms outwardly.

3. A brake mechanism comprising a drum and a plate at one end thereof, a flexible internal brake band adapted to be expanded against said drum, a pair of levers pivoted intermediate their ends on said plate and each having an arm connected to and supporting a free end of said band, the pivots of said levers being separated a greater distance than the points of connection of their arms to said band, the other arms of said levers extending toward each other, said levers being so arranged as to cause the band to expand when said other arms are moved outwardly, and fluid pressure means to move the ends of said last mentioned lever arms substantially radially.

4. A brake mechanism comprising a drum and a plate at one end thereof, an internal brake band adapted to be expanded against said drum and having lugs at its ends, said lugs having holes extending parallel to said plate and substantially parallel to the adjacent outer surfaces of the band, a pair of levers pivoted on said plate, the pivots of said levers being spaced a greater distance apart than said lugs, said levers having arms extending through said holes in the lugs, adjustable means on said arms engaging the lugs, the other arms of said levers extending toward each other, and means to move said last named arms.

GEORGE H. VINETTE.